(12) United States Patent
Su

(10) Patent No.: US 10,579,900 B2
(45) Date of Patent: Mar. 3, 2020

(54) SIMPLE PROGRAMMING METHOD AND DEVICE BASED ON IMAGE RECOGNITION

(71) Applicant: MATATALAB CO., LTD., Shenzhen (CN)

(72) Inventor: Rongxing Su, Shenzhen (CN)

(73) Assignee: MATATALAB CO., LTD., Shenzhen (CN)

( * ) Notice: Subject to any disclaimer, the term of this patent is extended or adjusted under 35 U.S.C. 154(b) by 73 days.

(21) Appl. No.: 15/984,372

(22) Filed: May 20, 2018

(65) Prior Publication Data

US 2019/0102648 A1    Apr. 4, 2019

(30) Foreign Application Priority Data

Sep. 29, 2017    (CN) .......................... 2017 1 0911024

(51) Int. Cl.
*G06K 9/62*    (2006.01)
*G06F 8/34*    (2018.01)
*G06K 9/40*    (2006.01)

(52) U.S. Cl.
CPC ............ *G06K 9/6202* (2013.01); *G06F 8/34* (2013.01); *G06K 9/40* (2013.01); *G06K 9/6204* (2013.01)

(58) Field of Classification Search
CPC ...... G06K 9/6204; G06K 9/6202; G06K 9/40; G06K 9/18; G06F 8/34; B25J 9/1658
See application file for complete search history.

(56) References Cited

U.S. PATENT DOCUMENTS

| 6,546,436 B1* | 4/2003 | Fainmesser | A63H 30/02 345/156 |
| 2014/0297035 A1* | 10/2014 | Bers | A63H 11/00 700/257 |
| 2016/0085518 A1* | 3/2016 | I | G06K 9/00201 717/105 |

OTHER PUBLICATIONS

C.h.e.r.p. http://ase.tufts.edu/DevTech/tangiblek/research/cherp.asp, pp. 1-10, 2011. (Year: 2011).*

* cited by examiner

*Primary Examiner* — Yon J Couso

(57) ABSTRACT

The disclosure discloses a method and device for image recognition. The method comprises: placing instruction blocks in a required order; acquiring an encoded instruction block image that represents the instruction block pattern and the placement order; recognizing a single instruction block image from the encoded instruction block image; comparing the single instruction block image with a standard instruction block image to obtain the matching degree of the instruction block; determining, according to the matching degree, standard instruction blocks corresponding to respective instruction block images; sorting the instruction block images according to the coordinates in the encoded instruction block image; parsing the instruction block images according to the sorting order to obtain instructions. The method for image recognition can help children learning concepts such as manipulation, use and programming of intelligent programmable devices more easily.

13 Claims, 4 Drawing Sheets

SIMPLE PROGRAMMING METHOD AND DEVICE BASED ON IMAGE RECOGNITION

CROSS-REFERENCE TO RELATED APPLICATIONS

This application is based upon and claims priority of Chinese Patent Application No. 201710911024.6, filed before Chinese Patent Office on Sep. 29, 2017 and entitled "SIMPLE PROGRAMMING METHOD AND DEVICE BASED ON IMAGE RECOGNITION", the entire contents of which is incorporated herein by reference.

TECHNICAL FIELD

The present disclosure relates to the field of computer technology, and in particular, to a simple programming method and device based on image recognition.

BACKGROUND

In recent years, automatically controlled robots have made significant progress and have achieved more and more functions. Each action of an automatically controlled robot is executed on the basis of a program which has been compiled in a computer language. A program is a set of instructions to be executed by a computer, and all the programs are written in computer languages. A programming language is a standardized computer language that contains grammars and semantics; wherein grammars describe symbol or word combinations in a correct way in a programming language, and semantics explain programming.

For programmable robots which are used for children's learning and intellectual development, although it is relatively easy to learn how to use a programmable robot, that is, how to operate the programmable robot, the functions of each type of programmable robots are limited, and after a period of time, children will lose interest in the programmable robots, which fails to give full play to the potential of the programmable robots and causes resource waste.

In fact, the reason of programmable robots for not being able to give full play to their potential is that programming languages are relatively complex and need to be operated by inputting text language through a keyboard, and only professionally trained persons can use programming languages for programming. Untrained persons, especially children, find it difficult to use programming languages to exploit the potential of programmable robots.

SUMMARY

The purpose of the present disclosure is to provide a simple programming method and device based on image recognition, to solve the problem of difficulty in learning and using existing programmable modules.

To achieve the above purpose, the technical solution of the present disclosure is to provide a simple programming method based on image recognition, including the following steps:

Step S1, the user placing instruction blocks in a required order;

Step S2, acquiring an encoded instruction block image that represents the instruction block pattern and the placement order;

Step S3, recognizing a single instruction block image from the encoded instruction block image;

Step S4, comparing the single instruction block image with a standard instruction block image to obtain the matching degree of the instruction block;

Step S5, determining, according to the matching degree, standard instruction blocks corresponding to respective instruction block images;

Step S6, sorting the instruction block images according to the coordinates in the encoded instruction block image;

Step S7, parsing the instruction block images according to the sorting order to obtain programming instructions.

Wherein, the step S3 includes:

Step S31, performing image pre-processing of the encoded instruction block image;

Step S32, removing the interference information in the encoded instruction block image;

Step S33, splitting the encoded instruction block image to obtain a single instruction block image.

Preferably, the simple programming method based on image recognition further includes:

Step S8, transferring the programming instructions, via Bluetooth, Wi-Fi, ZigBee, or a mobile network, to a programmable execution module for execution.

Preferably, the simple programming method based on image recognition further includes:

configuring the corresponding relationship between the instruction blocks and the encoded instruction.

To achieve the purpose of the present disclosure, the technical solution of the present disclosure further provides a simple encoding device, which includes instruction blocks, an image collection unit, an image recognition unit, an image comparison unit, an image encoding unit and a parsing unit, and the image collection unit, the image recognition unit, the image comparison unit, the image encoding unit and the parsing unit are sequentially in signal connection; wherein, Patterns are provided on the surfaces of the instruction blocks;

The image collection unit is configured to acquire the instruction block images placed in order;

The image recognition unit is configured to recognize a single instruction block image from the instruction block images placed in order;

The image comparison unit is configured to compare the single instruction block image with a standard instruction block image to obtain the matching degree of the instruction block, and determine standard instruction blocks corresponding to respective instruction block images according to the matching degree;

The image encoding unit is configured to sort the instruction block images according to the coordinates in the encoded instruction block image;

The parsing unit is configured to parse the instruction block images according to the sorting order to obtain programming instructions.

Wherein, the image recognition unit comprises an image pre-processing module and a splitting module, and the image pre-processing module and the splitting module are in signal connection; wherein, The image pre-processing module is configured to remove the interference information in the instruction block image;

The splitting module is configured to split the encoded instruction block image to obtain a single instruction block image.

Preferably, the simple programming device based on image recognition further includes a communication unit for communication between the simple programming device based on image recognition and the programmable execution module.

Preferably, the simple programming device based on image recognition further includes a configuration unit, and the configuration unit is used for configuring the corresponding relationship between the instruction blocks and the encoding instructions.

Preferably, the simple programming device based on image recognition further includes a support stand and an auxiliary rod, the auxiliary rod being provided at a side of the support stand, the auxiliary rod being connected with the support stand; the image collection unit being provided on an upper portion of the auxiliary rod; the support stand is used for supporting the instruction blocks.

Wherein, the image collection unit is a video camera or a camera.

The present disclosure has the following advantages:

The simple programming method based on image recognition provided by the present disclosure uses the instruction blocks to perform encoding, then obtains the instruction block image, recognizes the instruction block image, and then converts the instruction block image into programming instructions. Because the instruction block is perceivable and touchable, it is convenient for children and other non-professionals to recognize and memorize the instruction block. This situation facilitates programming training for non-professionals such as children, adds fun to toys and learning tools that include programmable execution modules, and helps children to learn concepts such as the manipulation, use, and programming of intelligent programmable devices more easily; and it can give full play to the potential of robots and make them more effective. At the same time, by the use of image recognition technology, compared with other technical solutions, the programming pattern of the programming module can be extended at a low cost, which helps provide a rich usage experience and product popularity.

DETAILED DESCRIPTION

The following embodiments are intended to illustrate the present disclosure but are not intended to limit the scope of the present disclosure.

Embodiment 1

Figure 1:
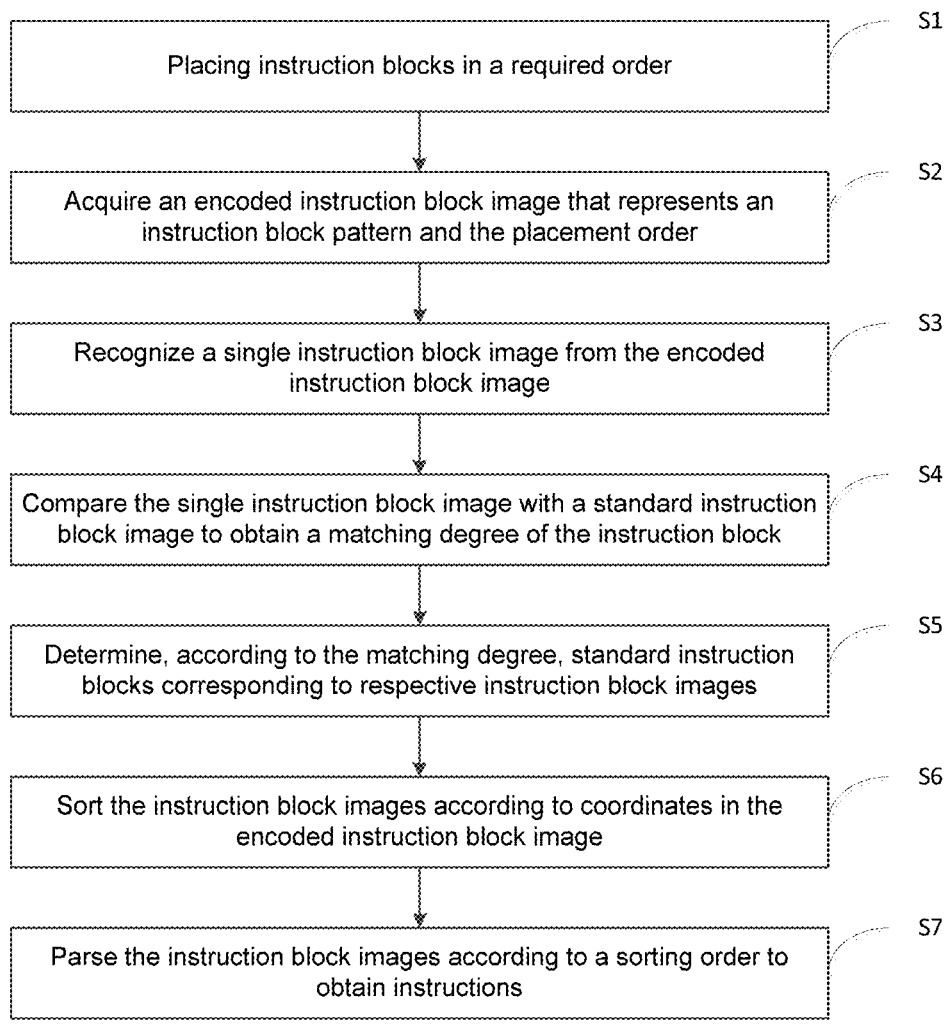
FIG. 1 is a flowchart of a simple programming method based on image recognition provided by an embodiment of the present disclosure.

As shown in FIG. 1, the simple programming method based on image recognition in this embodiment includes the following steps.

Step S1, the user placing instruction blocks in a required order.

The user places instruction blocks according to the instruction he wants to execute. The instruction blocks are similar to building blocks and can take different shapes. Different patterns are arranged on the surfaces of the instruction blocks, and these patterns correspond to encoded instructions. Moreover, the patterns of the instruction blocks can be classified according to different functions. For an intelligent robot, the patterns of the instruction blocks include action type patterns, flow control type patterns, and parameter type patterns; wherein the action type patterns may enable the robot to perform actions including but not limited to going forward, going backward, turning left, turning right, playing music, dancing and the like. The flow control type patterns may make the robot change the program operation sequence including but not limited to loops, functions, conditions, waits, and the like. The parameter type patterns are auxiliary parameters including but not limited to numbers, angles and events, which provide additional parameters for other instruction blocks.

Step S2, acquiring an encoded instruction block image that represents the instruction block pattern and the placement order.

A filming tool such as a camera or mobile phone is used to acquire the encoded instruction block image that represents the instruction block pattern and placement order.

Step S3, recognizing a single instruction block image from the encoded instruction block image.

Wherein, the step S3 specifically includes:

Step S31, performing image pre-processing of the encoded instruction block image.

The image pre-processing includes, but is not limited to, a processing procedure such like rotation correction.

Step S32, removing the interference information in the encoded instruction block image.

The interference information in the encoded instruction block image is removed to reduce the influence of the light on the recognition result of the building blocks at the time of filming, and the interference information includes but is not limited to shadows.

Step S33, splitting the encoded instruction block image to obtain a single instruction block image.

The image is split into pictures of individual instruction blocks.

Step S4, comparing the single instruction block image with a standard instruction block image to obtain the matching degree of the instruction block.

In step S4, the single instruction block image is compared with the standard instruction block image, and the matching degree of the instruction block is obtained.

Step S5, determining, according to the matching degree, standard instruction blocks corresponding to respective instruction block images.

After the comparison, if there are multiple matching degrees and the multiple matching degrees are all higher than a preset predetermined value, the standard instruction block with the highest matching degree is preferably used as the standard instruction block corresponding to the instruction block image.

Step S6, sorting the instruction block images according to the coordinates in the encoded instruction block image.

The coordinates in the encoded instruction block image are the coordinates at which the instruction blocks are placed in sequence.

Step S7, parsing the instruction block images according to the sorting order to obtain programming instructions.

In step S7, the images correspond to the programming instructions in a one-to-one manner. In step S6, the images are converted into programming instructions.

In addition, the simple programming method based on image recognition in this embodiment further includes:

Step S8, transferring the programming instructions to the programmable execution module for execution.

In step S8, the method of transferring the programming instructions includes, but is not limited to, Bluetooth, Wi-Fi, ZigBee, or mobile network (2G; 3G; 4G; and future 5G) communications.

As a preferred embodiment of the present embodiment, the simple programming method based on image recognition further includes the step of configuring the corresponding relationship between instruction blocks and encoding instructions. This step allows the user to design images and set control instructions for corresponding images, which increases the flexibility and application scope of the programming.

The simple programming method based on image recognition provided in this embodiment uses instruction blocks to perform encoding, then obtains instruction block images, recognizes the instruction block images, and then converts the instruction block images into programming instructions. Because the instruction blocks are perceivable and touchable, it is convenient for children and other non-professionals to recognize and memorize the instruction blocks. This situation facilitates programming training for non-professionals such as children, adds fun to toys and learning tools that include programmable execution modules, and helps children to learn concepts such as the manipulation, use, and programming of intelligent programmable devices more easily.

Embodiment 2

Figure 2:
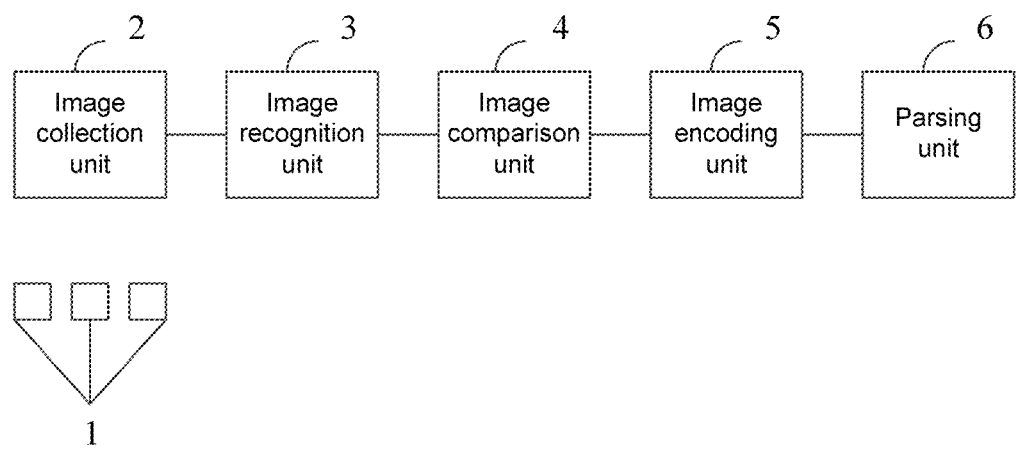
FIG. 2 is a block diagram of the principle of a simple programming device based on image recognition provided by an embodiment of the present disclosure.

As shown in FIG. 2, this embodiment provides a simple encoding device, which includes instruction blocks 1, an image collection unit 2, an image recognition unit 3, an image comparison unit 4, an image encoding unit 5, and a parsing unit 6, and the image collection unit 2, the image recognition unit 3, the image comparison unit 4, the image encoding unit 5, and the parsing unit 6 are sequentially in signal connection. Wherein, patterns are arranged on the surfaces of the instruction blocks 1. In use, the user places the instruction blocks 1 according to the instructions that he wants to execute. The instruction blocks 1 are similar to building blocks and can take different shapes such as square, round and prismatic shapes. Different patterns are arranged on the surfaces of the instruction blocks 1, and these patterns correspond to encoded instructions in a one-to-one manner. Moreover, the patterns of the instruction blocks 1 can be classified according to different functions. For an intelligent robot, the patterns of the instruction blocks 1 include action type patterns, flow control type patterns, and parameter type patterns; wherein the action type patterns may enable the robot to perform actions including but not limited to going forward, going backward, turning left, turning right, playing music, dancing and the like. The flow control type patterns may cause the robot to change the program operation sequence including but not limited to loops, functions, conditions, waits, and the like. The parameter type patterns are auxiliary parameters including but not limited to numbers, angles and events, which provide additional parameters for other instruction blocks.

The image collection unit 2 is configured to acquire the instruction block images placed in order. The image collection unit 2 employs but is not limited to a video camera or a camera.

The image recognition unit 3 is configured to recognize a single instruction block image from the instruction block images placed in order. The image recognition unit 3 includes an image pre-processing module and a splitting module, and the image pre-processing module and the splitting module are in signal connection; wherein, the image pre-processing module is configured to remove the shadows in the instruction block images. The splitting module is configured to split the encoded instruction block images to obtain a single instruction block image.

The image matching unit 4 is configured to determine whether the matching degree is greater than a preset matching value. Specifically, the image matching unit 4 compares the single instruction block image with a standard instruction block image to obtain the matching degree of the instruction block, and determines standard instruction blocks corresponding to respective instruction block images according to the matching degree.

The image encoding unit 5 is configured to sort the instruction block images according to the coordinates in the encoded instruction block image.

The parsing unit 6 is configured to parse the instruction block images according to the sorting order to obtain programming instructions.

In addition, this embodiment further includes a communication unit for communications between the simple programming device based on image recognition and the programmable execution module. The communication unit includes but is not limited to Bluetooth, Wi-Fi, ZigBee, or mobile network (2G, 3G, 4G, and future 5G) communication unit.

As a preferred embodiment of the present embodiment, the simple programming device based on image recognition further includes a configuration unit, the configuration unit being communication connected with the image recognition unit, the image comparison unit and the parsing unit, and being used for configuring the corresponding relationship between instruction blocks and encoding instructions. The configuration unit allows the user to design images and configure control instructions corresponding to the images, expands the functions of the simple programming device based on image recognition, increases flexibility, and can support a variety of image designs and control instruction designs in the future. The configuration unit makes the robot have good low-cost scalability, satisfies the demands of different user groups to design various types of robot control instructions, and can support a variety of programmable robotic devices.

In this embodiment, the instruction blocks provided with action type patterns are action type instruction blocks, the instruction blocks provided with flow control type patterns are flow type instruction blocks, and the instruction blocks provided with parameter type patterns are parameter type instruction blocks. Different types of instruction blocks are converted according to the corresponding logic, during recognition.

Wherein, there is a one-to-one corresponding relationship between the action type instruction blocks and the robot's actions, and the instruction blocks are directly converted into robot instructions after being recognized. The flow control instruction blocks do not directly control the robot, but change the execution sequence of the robot actions through the corresponding logic, for example, the loops will sequentially convert a group of instruction blocks between the loop start instruction block and the loop end instruction block into multiple groups of robot instructions. The parameter type instruction blocks provide auxiliary parameters, and if the robot action type instruction blocks have been attached with parameter types, the parameters will be attached to the instructions of the instruction blocks. If the flow control type instruction blocks have been attached with parameter type instruction blocks, the parameter will be used in the logic corresponding to the instruction blocks. For example, a parameter of 3 is attached to the loop start instruction, and a group of instruction blocks between the loop start instruction block and the loop end building block are sequentially converted into 3 groups of robot instructions.

Embodiment 3

Figure 3A:
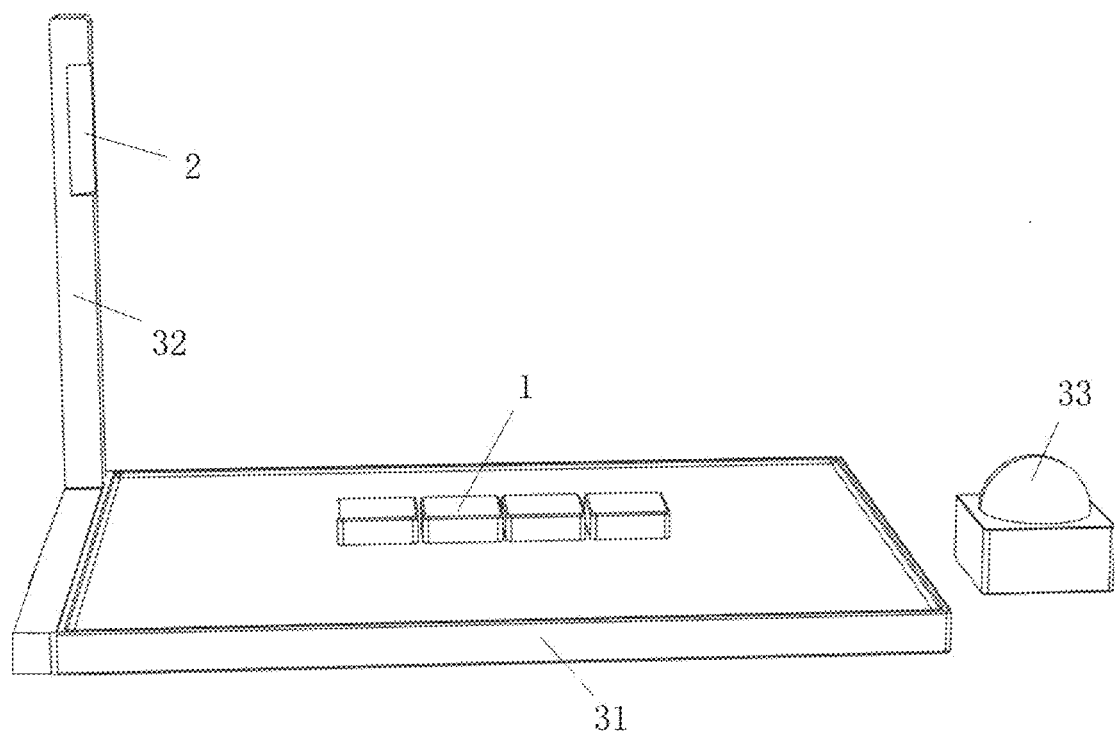
FIG. 3a is a schematic diagram of a partial structure of a simple programming device based on image recognition provided by an embodiment of the present disclosure.

As shown in FIG. 3a, the simple programming device based on image recognition further includes a support stand 31 and an auxiliary rod 32, the auxiliary rod 32 being provided at a side of the support stand 31, the auxiliary rod 32 being connected with the support stand 31; the image collection unit 2 being provided on an upper portion of the auxiliary rod 32. The instruction blocks can be arranged on the bearing surface of the support stand 31, and the image collection unit 2 can photograph the entire area of the support stand 31.

Figure 3B:
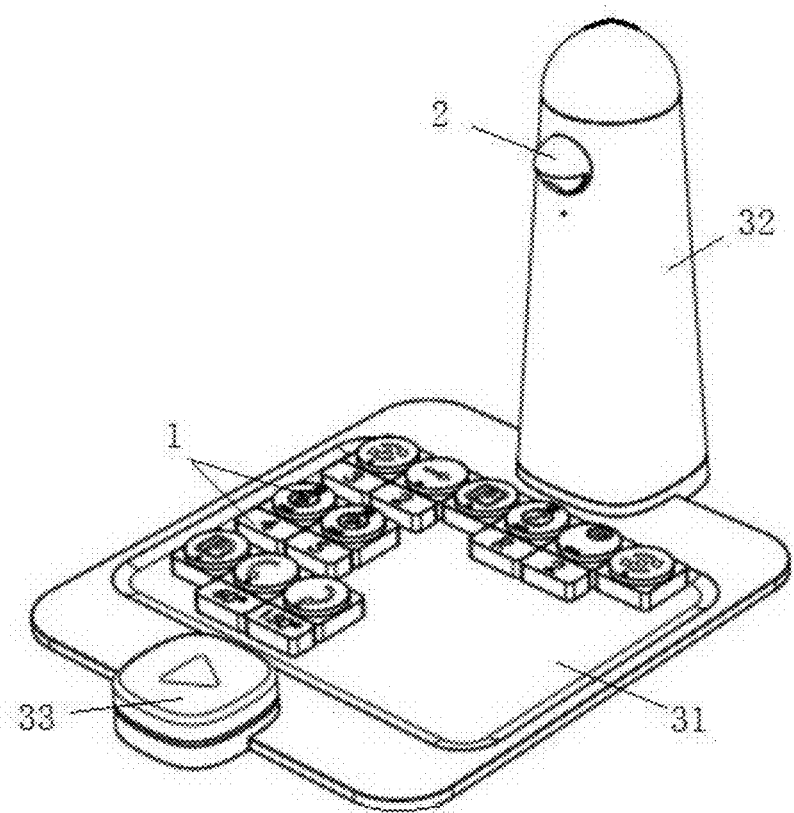
FIG. 3b is a schematic diagram of a partial structure of another simple programming device based on image recognition provided by an embodiment of the present disclosure.

In addition, the simple programming device based on image recognition further includes an execution key 33, and the execution key 33 is in signal connection with the image collection unit 2. By executing of the execution key 33, the image collection unit 2 can be activated for image collection and subsequent image recognition, image comparison, image encoding and parsing units. In this embodiment, the execution key 33 is disposed separate from the support stand 31. However, the present disclosure is not limited thereto, and the execution key 33 and the support stand 31 may also be fixedly connected, as shown in FIG. 3b.

Figure 3C:
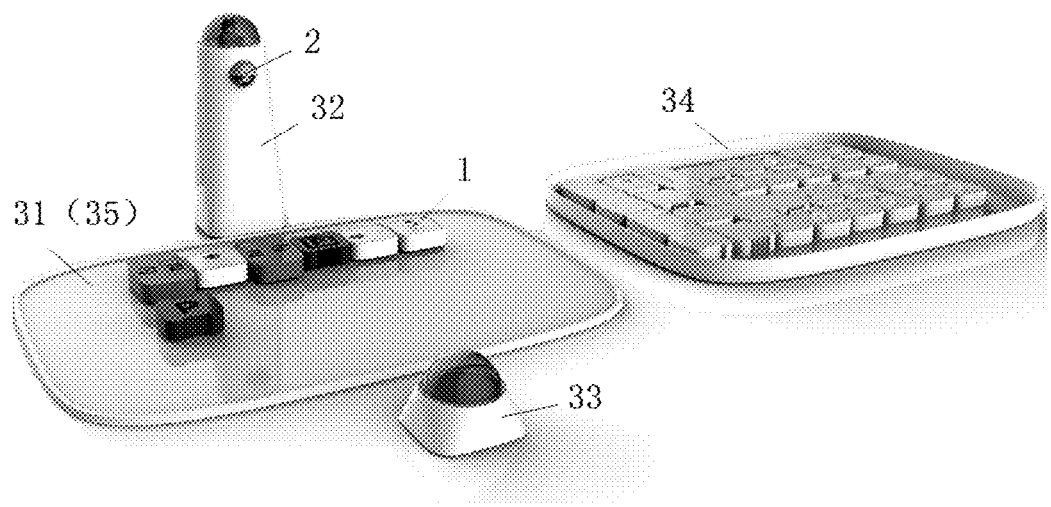
FIG. 3c is a schematic diagram of a partial structure of still another simple programming device based on image recognition provided by an embodiment of the present disclosure.

As a modified embodiment of the present embodiment, the auxiliary rod 32 and the support stand 31 are separately disposed, that is, the auxiliary rod 32 can be moved freely out of the support stand 31, and the image collection unit 2 is disposed on the auxiliary rod 32. In addition, in order to accommodate the instruction blocks 1, the instruction blocks 1 are usually placed in an accommodation box 34. In encoding, a box cover 35 of the accommodation box 34 may be used as a support stand 31 to place the instruction blocks 1, as shown in FIG. 3c.

Figure 3D:
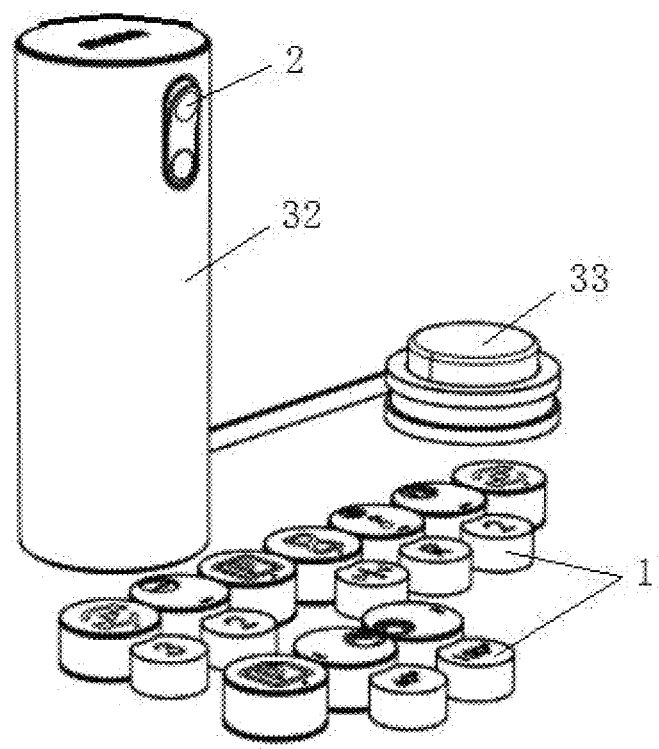
FIG. 3d is a schematic diagram of a partial structure of yet another simple programming device based on image recognition provided by an embodiment of the present disclosure.

It is easy to understand that a bearing surface such as a table top may also be used as the support stand 31. In other words, the simple programming device based on image recognition may also include only the image collection unit 2, the auxiliary rod 32, and the execution key 33. The image collection unit 2 is disposed on the auxiliary rod 32, and the image collection unit 2 is in signal connection with the execution key 33, as shown in FIG. 3d.

The simple programming device based on image recognition provided in this embodiment uses the instruction blocks to encode, then obtains the instruction block image, recognizes the instruction block image, and then converts the instruction block image into programming instructions. Because the instruction block is perceivable and touchable, it is convenient for children and other non-professionals to recognize and memorize the instruction block. This situation facilitates programming training for non-professionals such as children, adds fun to toys and learning tools that include programmable execution modules, and helps children to performs the manipulation and use of intelligent programmable devices more easily; and the simple programming device based on image recognition may perform the programming control of robot motion/music/drawing, etc., and it can also perform the programming control of programmable devices such as RGB dot matrix modules or sensor modules and helps the learning of programming concepts.

Although the present disclosure has been described above in detail with general description and specific embodiments, it is obvious to those skilled in the art that some modifications or improvements can be made on the basis of the present disclosure. Therefore, these modifications or improvements made without departing from the spirit of the present disclosure all fall within the protection scope of the present disclosure.

What is claimed is:

1. A method for image recognition comprising:
   acquiring an encoded instruction block image that represents images of instruction blocks and a placement order of the instruction blocks, wherein top surfaces of the instruction blocks include patterns;
   recognizing each single instruction block image from the encoded instruction block image;
   comparing the each single instruction block image with standard instruction block images to obtain matching degrees of the each single instruction block image to the standard instruction block images;
   determining, according to the matching degrees, the standard instruction block corresponding to the each single instruction block image;
   sorting the each single instruction block image in the encoded instruction block image in a sorting order according to coordinates in the encoded instruction block image;
   parsing the encoded instruction block image according to the sorting order to obtain instructions.

2. The method according to claim 1, wherein recognizing each single instruction block image from the encoded instruction block image comprises:
   performing an image pre-processing to the encoded instruction block image;
   removing interference information in the encoded instruction block image; and
   splitting the encoded instruction block image to obtain the each single instruction block image.

3. The method according to claim 1, further comprising:
   transferring the instructions, via Bluetooth, Wi-Fi, ZigBee, or a mobile network, to a programmable execution device for execution.

4. The method according to claim 3, further comprising:
   configuring the corresponding relationship between the instruction blocks and the instructions.

5. A simple encoding device, comprising:
   instruction blocks placed in an order, wherein top surfaces of the instruction blocks include patterns;
   an image collection unit configured to acquire an encoded instruction block image including information of the order of the instruction blocks;
   a non-transitory memory storage comprising instructions; and
   one or more processors in communication with the image collection unit and to the non-transitory memory, wherein the one or more processors execute the instructions to:

recognize each single instruction block image from the encoded instruction block image;

compare the each single instruction block image with standard instruction block images to obtain matching degrees of the each single instruction block image to the standard instruction block images, and determine a standard instruction block image corresponding to the each single instruction block image with a highest matching degree;

sort the encoded instruction block image in a sorting order according to coordinates of the encoded instruction block image; and parse the encoded instruction block image according to the sorting order to obtain executable instructions.

6. The simple encoding device according to claim 5, further comprising:

a support stand for placing the instruction blocks; and an auxiliary rod being provided at a side of the support stand, wherein the auxiliary rod is connected to the support stand, and the image collection unit is provided on an upper portion of the auxiliary rod.

7. The simple encoding device according to claim 6, further comprising an execution key to start acquiring the encoded instruction block image by the image collection unit, wherein the execution key is provided away from the support stand.

8. The simple encoding device according to claim 6, further comprising an execution key to start acquiring the encoded instruction block image by the image collection unit, wherein the execution key is provided connected to the support stand.

9. The simple encoding device according to claim 8, wherein the image collection unit is a video camera or a camera.

10. The simple encoding device according to claim 8, further comprising an antenna to communicate with a programmable execution device.

11. The simple encoding device according to claim 8, wherein the instruction to recognize each single instruction block image from the encoded instruction block image:

pre-process the encoded instruction block image;

remove interference information in the encoded instruction block image; and split the encoded instruction block image to obtain the each single instruction block image.

12. The simple encoding device according to claim 8, wherein pre-process the encoded instruction block image includes a rotation process.

13. The simple encoding device according to claim 8, wherein the instruction further comprises:

configure corresponding relationships between the instruction blocks and the executable instructions.

* * * * *